United States Patent
Suel, II et al.

(10) Patent No.: US 8,952,648 B2
(45) Date of Patent: Feb. 10, 2015

(54) WASHING MACHINE WITH IMPROVED BRAKING METHOD

(75) Inventors: Richard Dean Suel, II, Louisville, KY (US); John Steven Holmes, Louisville, KY (US); Meher Prasadu Kollipara, Louisville, KY (US); Mariano Pablo Filippa, Auburndale, MA (US); Shyam Sunder Ramamurthy, Louisville, KY (US)

(73) Assignee: General Electric Company, Schenectady, NY (US)

( * ) Notice: Subject to any disclaimer, the term of this patent is extended or adjusted under 35 U.S.C. 154(b) by 1129 days.

(21) Appl. No.: 12/942,454

(22) Filed: Nov. 9, 2010

(65) Prior Publication Data

US 2012/0111065 A1    May 10, 2012

(51) Int. Cl.
*H02P 3/24* (2006.01)
*D06F 33/02* (2006.01)
*D06F 37/42* (2006.01)

(52) U.S. Cl.
CPC   *H02P 3/24* (2013.01); *D06F 33/02* (2013.01); *D06F 37/42* (2013.01)
USPC .......................... 318/760; 318/375; 318/759

(58) Field of Classification Search
USPC .......................... 318/375–381, 757, 759, 760
See application file for complete search history.

(56) References Cited

U.S. PATENT DOCUMENTS

| | | | | |
|---|---|---|---|---|
| 1,794,961 | A | * | 3/1931 | James .......................... 318/744 |
| 3,209,225 | A | * | 9/1965 | Choudhury ................... 318/762 |
| 3,581,168 | A | * | 5/1971 | Kirkby ......................... 318/759 |
| 4,305,030 | A | | 12/1981 | Lorenz |
| 4,392,098 | A | * | 7/1983 | Min .............................. 318/758 |
| 4,857,818 | A | * | 8/1989 | Hobbs .......................... 318/762 |
| 5,247,231 | A | | 9/1993 | Glucina |
| 5,325,677 | A | | 7/1994 | Payne et al. |
| 6,189,171 | B1 | | 2/2001 | Savkar et al. |
| 6,748,618 | B1 | | 6/2004 | Darby et al. |
| 6,834,407 | B2 | | 12/2004 | Stephens |
| 7,481,080 | B2 | | 1/2009 | Hoppe |
| 2005/0120492 | A1 | | 6/2005 | Koo et al. |
| 2008/0295543 | A1 | | 12/2008 | Brubaker et al. |

* cited by examiner

*Primary Examiner* — Bentsu Ro
(74) *Attorney, Agent, or Firm* — Dority & Manning, P.A.

(57) ABSTRACT

A method of braking a washing machine from an operational speed to a zero speed is provided (as well as a washing machine incorporating the method) for a washing machine driven by one of a synchronous or asynchronous motor. Upon receipt of a stop signal, collapsing the motor rotating magnetic fields are collapsed for a predefined time period. After the predefined time period, DC braking voltage is applied to the motor stator windings at a controlled ramp-up rate to a fixed amplitude to generate a controlled ramped braking torque on the motor. The braking torque is applied until the motor is stopped.

15 Claims, 5 Drawing Sheets

WASHING MACHINE WITH IMPROVED BRAKING METHOD

FIELD OF THE INVENTION

The present invention relates generally to the field of washing machines, and more particularly to a method for braking a washing machine from an operational speed to a zero speed.

BACKGROUND OF THE INVENTION

Conventional washing machines typically include a spin basket or "tub" that holds articles (e.g., clothing) to be washed. An agitator is typically disposed within the basket, and a motor provides the drive for the basket and agitator. The motor is typically a variable speed motor (such as a variable speed AC induction motor), which is also reversible to carry out certain wash cycle functions. For example, the motor may rotate in a first direction during the agitation mode and in a second, opposite mode in the spin cycle. Other motor types have also been used in washing machines for various reasons, including permanent magnet motors such as three-phase electronically commutated (EC) motors.

The typical wash cycle of a washing machine includes various sequential operational modes, such as fill, drain and spin, agitation, and spin. Braking of the basket or agitator can occur before, during or after the various modes, and the braking characteristics may be dictated by the wash cycle parameters and/or safety standards, such as Underwriters Laboratory (UL) standards. For example, typical intermittent wash load braking during the spin mode is performed in accordance with UL safety standards. If the washing machine lid is opened during the spin cycle, the machine must brake to zero speed (zero angular velocity) within a predetermined time limit dictated by a UL safety standard, which is presently a seven (7) second stop time.

Various braking methods and associated hardware are known for washing machines, including mechanical braking systems and electrically induced braking torque methods. The mechanical systems that use brake pads or shoes to bring a fully loaded rotating basket to zero speed are costly to implement and maintain. The brake shoes/pads have a limited design life and will eventually wear and need replacement. The wear rate will depend on a number of factors (i.e., load size, water level in tub, frequency of use, etc.) and will vary from one machine to another.

"Dynamic braking" refers to various methods for controlling power to the motor such that the stator field rotates at a frequency that is less than the rotational frequency of the rotor, thus generating a braking torque on the rotor. These methods turn the motor into a generator and the regenerated power is dissipated via a braking resistor. This method is deemed "dynamic" in that the braking torque is proportional to the kinetic energy in the motor load. However, as the load diminishes, the braking torque also decreases. Thus, dynamic braking systems often include a different "finishing" brake to bring the motor to a complete stop, such as a mechanical brake.

"Regenerative braking" is essentially the same concept as dynamic braking except, rather than being dissipated, the regenerated power is converted back to machine electrical power via a line synchronization technique.

The dynamic and regenerative braking methods thus require braking resistors and line synchronization circuitry/hardware, which results in an increased cost per machine. For example, the use of braking resistors impacts component sizing in the control circuit and the overall cost of such circuit.

DC injection braking is a method for braking synchronous or asynchronous motors wherein DC voltage is applied to the stator windings to produce a stationary magnetic field. The spinning rotor is magnetically drawn to this stationary magnetic field, which acts as a drag (i.e., a braking force) on the rotor and will eventually stop rotation of the motor. DC injection braking has certain benefits in that it is relatively inexpensive to implement, particularly in variable frequency drives (VFD) wherein DC power is already inherently generated. However, DC injection braking has not been used in washing machines over the full operational loads and speeds of the machines due to the relatively large induced current spikes (and resulting thermal stresses) generated in the motor at higher loads and speeds. The decreased motor life resulting from the stress of repeated DC injection braking over the typical life cycle of a washing machine has virtually eliminated DC injection braking as the sole braking method for conventional washing machines.

The published U.S. Patent Application No. 2008/0295543 describes a two-phase braking method for a washing machine utilizing an AC induction motor. Initially, the motor is braked in a "reverse frequency" mode (sometimes referred to as "plugging") to slow the motor to a first slow speed. In this mode, the stator electrical field is switched to rotate in the opposite direction of the rotating rotor and little regenerative power is produced. Once the motor has slowed, it is then braked to a stop in a DC braking mode.

U.S. Pat. No. 4,305,030 describes a braking method for an AC induction motor wherein a DC braking current is quickly supplied to the motor when AC power is disconnected to cause an immediate and rapid decrease in motor speed, as well as to prevent activation of a mechanical brake. Immediately upon disconnecting the AC power, a control circuit causes a capacitor to discharge and effectuate an immediate turn-on of the DC braking current with a large initial amplitude of DC current. This rapid turnover is followed by a smaller value of DC braking current for a controlled period of time. Although this method utilizes DC braking over the full range of motor speeds, the system would not be particularly useful for the repeated starts and stops of a washing machine motor. The repeated rapid and sudden charge of initial DC braking current will cause potentially damaging current spikes and significantly shorten the life of the motor and electronics in any washing machine.

Accordingly, the industry would benefit from a braking methodology that takes advantage of the inherent benefits of DC braking of motors while decreasing the disadvantages of such braking to within acceptable limits.

BRIEF DESCRIPTION OF THE INVENTION

Aspects and advantages of the invention will be set forth in part in the following description, or may be obvious from the description, or may be learned through practice of the invention.

The present invention encompasses various method embodiments for braking a washing machine from an operational speed to a complete stop (zero angular velocity). It should be appreciated that the methods are not limited to any particular type or style of washing machine, and are applicable to any washing machine that may be configured to operate as described herein. The washing machine uses a synchronous or asynchronous motor (e.g., a permanent magnet motor or an AC induction motor) for driving the machine's spin basket. Upon receipt/generation of a stop signal, for example upon opening the machine lid during the spin cycle, the motor rotating magnetic fields are collapsed for a predefined time period. For example, with an AC induction motor, the magnetic field can be collapsed by disabling an associated inverter's gate drivers for the predetermined time period. In other embodiments, for example with a permanent magnet motor, the magnetic field may be collapsed without disabling the gate drivers to avoid inducing a regenerative effect. After the predefined time period, DC braking voltage is applied to the stator windings at a controlled ramp rate up to a fixed amplitude to generate a controlled increasing braking torque on the motor. The braking torque is applied at the fixed amplitude until the motor is stopped, and may be held at the fixed amplitude for a defined time period after the motor has stopped.

It should be further appreciated that the various methodologies of the present invention are not limited to particular motor types other than the requirement that the motors are synchronous or asynchronous machines. For example, in a particular embodiment, the motor may be a three-phase motor (such as a three-phase AC motor), wherein for collapsing the stator rotating magnetic field, the frequency of the three-phase power signal is set to 0 Hz thereby freezing the phase angles of the power signal components, and the amplitude of the power signal components is set to 0 Volts for the predefined time period. Subsequently, the DC braking current may be generated by ramping up the amplitude of the power signal components at their respective frozen phase angles such that the amplitudes vary between the power signal components as a function of their frozen phase angles. In this embodiment, the AC motor may be an AC induction motor supplied with three-phase AC power from an inverter, whereby the motor's rotating magnetic field is further collapsed by disabling the inverter gate drivers for the predefined time period.

The invention also encompasses any manner of washing machine that is configured for the controlled braking process set forth herein. For example, a washing machine is provided having a synchronous or asynchronous motor configured for receipt of a multi-phase power signal for rotationally driving a spin basket. A motor control circuit for the machine may include an inverter and a motor controller. Upon receipt/generation of a motor stop signal, the motor controller is configured to control the inverter to collapse the motor rotating magnetic fields for a predefined time period. After this time period, the inverter is controlled to apply DC braking voltage to the motor stator windings at a controlled ramp rate up to a fixed amplitude to generate a controlled increasing braking torque applied to the motor. The inverter is further controlled to apply the braking torque until the motor is stopped.

The washing machine may be further configured to incorporate any combination of the features discussed above. For example, the motor controller may be programmable for changing any combination of: time period between collapsing the rotating magnetic fields and application of the DC braking voltage, ramp rate of the DC braking voltage to the fixed amplitude, the magnitude of the DC voltage fixed amplitude, and a time period for continued application of the DC braking voltage at the fixed amplitude after the motor has stopped.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Figure 1:
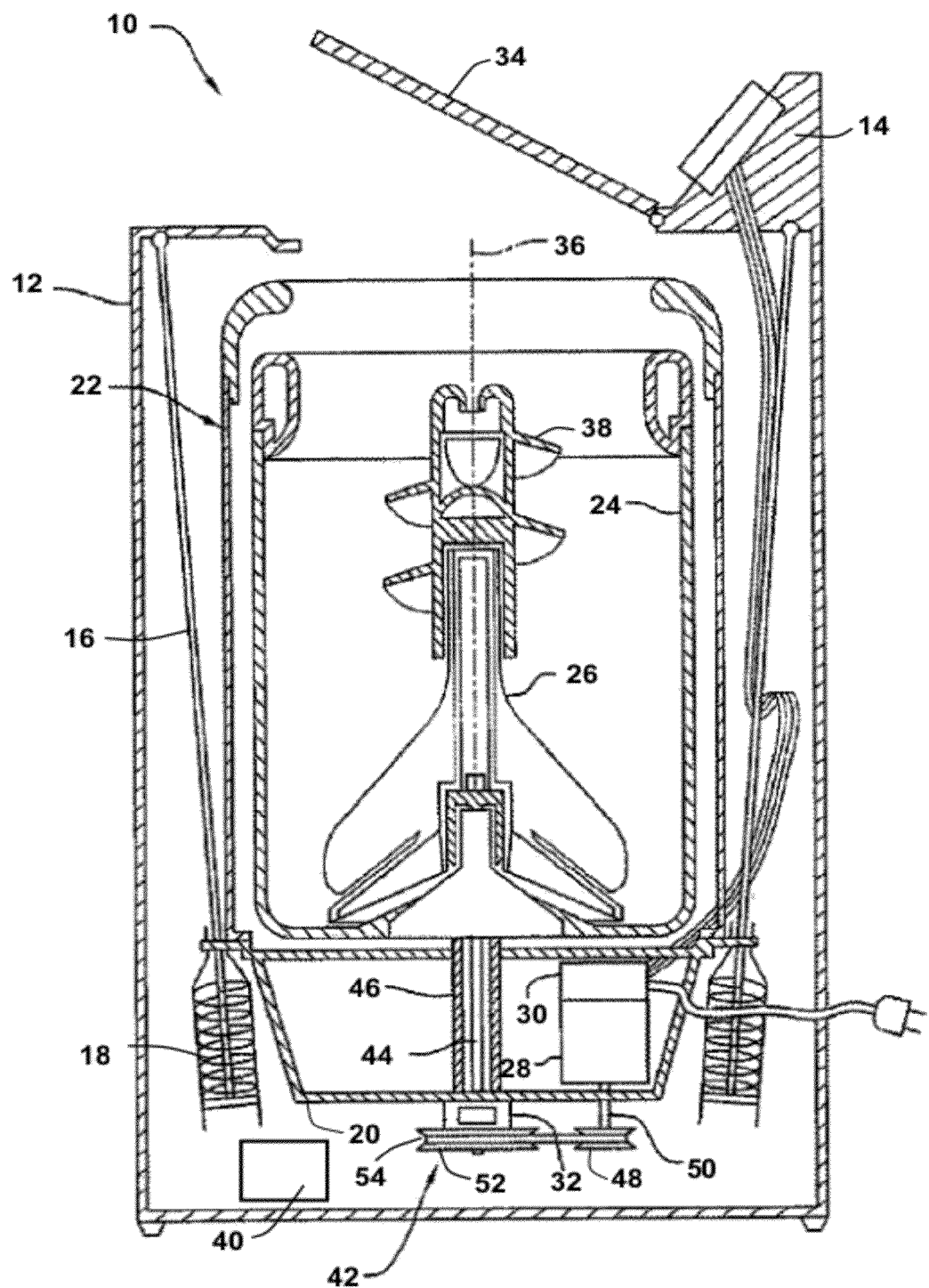
FIG. 1 is a side cut-away view of a conventional washing machine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 depicts an exemplary washing machine 10 that may be configured in accordance with aspects of the invention. As mentioned, it should be appreciated that the particular type or style of washing machine 10 is not a limiting factor of the invention, and that the machine 10 depicted in FIG. 1 and described herein is for illustrative purposes only. For example, the invention is just as applicable to front-loading washing machines.

The washing machine 10 includes a cabinet 12 that supports internal components of the washing machine 10, and a backsplash 14 on which are mounted various controls, a display, and so forth. Supported by the cabinet 12 is a suspension system that includes rods 16, springs 18, and a platform 20. The suspension system, which may be in accordance with system described in U.S. Pat. No. 5,520,029 entitled "Coil Spring and Snubber Suspension System for a Washer," provides the advantage of low transmissibility of out-of-balance forces to the cabinet 12, which improves the stability of the washing machine 10 and reduces system noise.

Supported on the platform 20 are a tub 22, basket 24, agitator 26, motor 28, motor controller 30, and mode shifter 32. The basket 24 holds articles such as clothes to be washed, and is accessed by a lid 34. The agitator 26 agitates the clothes in the basket 24 with a plurality of vanes as the agitator 26 oscillates about the drive axis 36. The washing machine 10 may also include an auger 38 mounted at the top of the agitator 26. The auger 38 further enhances the movement of the clothes within the basket 24. The basket 24 and agitator 26 are coaxially located within the tub 22 that retains the wash liquid (e.g., detergent and water) during the wash cycle. A pump 40 is provided to remove the wash liquid from the tub 22 when the wash cycle or rinse cycle is completed.

To power the washing machine 10, a motor 28 is coupled to the basket 24 and agitator 26 through a coupler 42, a mode shifter 32, an agitator drive shaft 44, and a basket drive shaft 46. In the embodiment of FIG. 1, the coupler 42 includes a motor pulley 48 connected to a motor shaft 50, a drive pulley 52 connected to the agitator drive shaft 44, and a belt 54 connecting the motor pulley 48 and the drive pulley 52. The motor 28 is an asynchronous or synchronous electric motor, and is desirably a variable speed motor.

As is understood in the art, a synchronous motor is generally defined as a motor distinguished by a rotor spinning at zero slip with the rotating magnetic field that drives it. Thus, such motors operate synchronously with the frequency generated by the inverter. A common example of a synchronous motor is a single or multiple-phase AC synchronous motor (with wound rotor or permanent magnet rotor). A brushless DC motor (also referred to as an electrically commutated (EC) motor) is another type of synchronous motor that uses switched DC fed to the stator and a permanent magnet rotor. Commutation of the windings in an EC motor is achieved by a solid-state circuit controlled by suitable means for sensing rotor position. One example of a suitable single phase ECM is the 44 FRAME motor manufactured by the General Electric Company. A permanent magnet AC synchronous motor and an EC motor operate in similar manners. A suitable permanent magnet motor may have an external rotor configuration.

As understood in the art, an asynchronous electric motor is generally distinguished by a rotor spinning at a different speed than the rotating magnetic field of the stator. An asynchronous motor does not have a permanent magnet rotor or direct current supply to the rotor, but relies on the rotating stator magnetic field to induce current in the rotor conductors (windings). The induced currents create a field that interacts with the stator rotating field to rotationally drive the rotor in the direction of the rotating field. The speed of the rotor must be less than the speed of the rotating magnetic field to generate the induced rotor currents. This speed difference is referred to as "slip." The most common asynchronous motors are single or three-phase AC induction motors.

A variable speed motor 28 is advantageous, because its rotational velocity and torque can be easily controlled, as compared, for example, with a traditional single phase AC induction motor. For example, a variable speed motor can be programmed to measure the torque induced in proportion to the clothes load. The resulting signal can be transmitted to a motor controller 30 during the fill operation to fill the tub 22 with just enough water to efficiently wash the clothes, thereby minimizing the water and energy usage. Examples of variable speed motors include brushless DC motors (e.g., EC motors and switched reluctance motors), universal motors, single-phase induction motors, and three-phase inverter driven induction motors. Because the torque, speed and rotational direction of the variable speed motor 28 are easily controlled, the washing machine 10 can operate without a transmission to change the direction of motion during the agitation mode. The motion of the agitator 26 and basket 24 in the various modes of the wash cycle is achieved with the motor controller 30.

The motor controller 30 includes any manner of hardware/ software configuration for controlling the various operating functions of the machine 10. For example, the motor controller 30 may include a microprocessor or microcontroller that is programmed to control the currents and voltages input to the motor for effecting motor reversal and thus the oscillatory motion of the agitator 26 in the agitate mode, or to increase the frequency of power supplied to the stator coils in spin mode to increase the rotational velocity of the basket 24 and agitator 26. The motor controller 30 may also be programmed to carry out the various phases of the DC braking process, as described in greater detail below.

Figure 2:
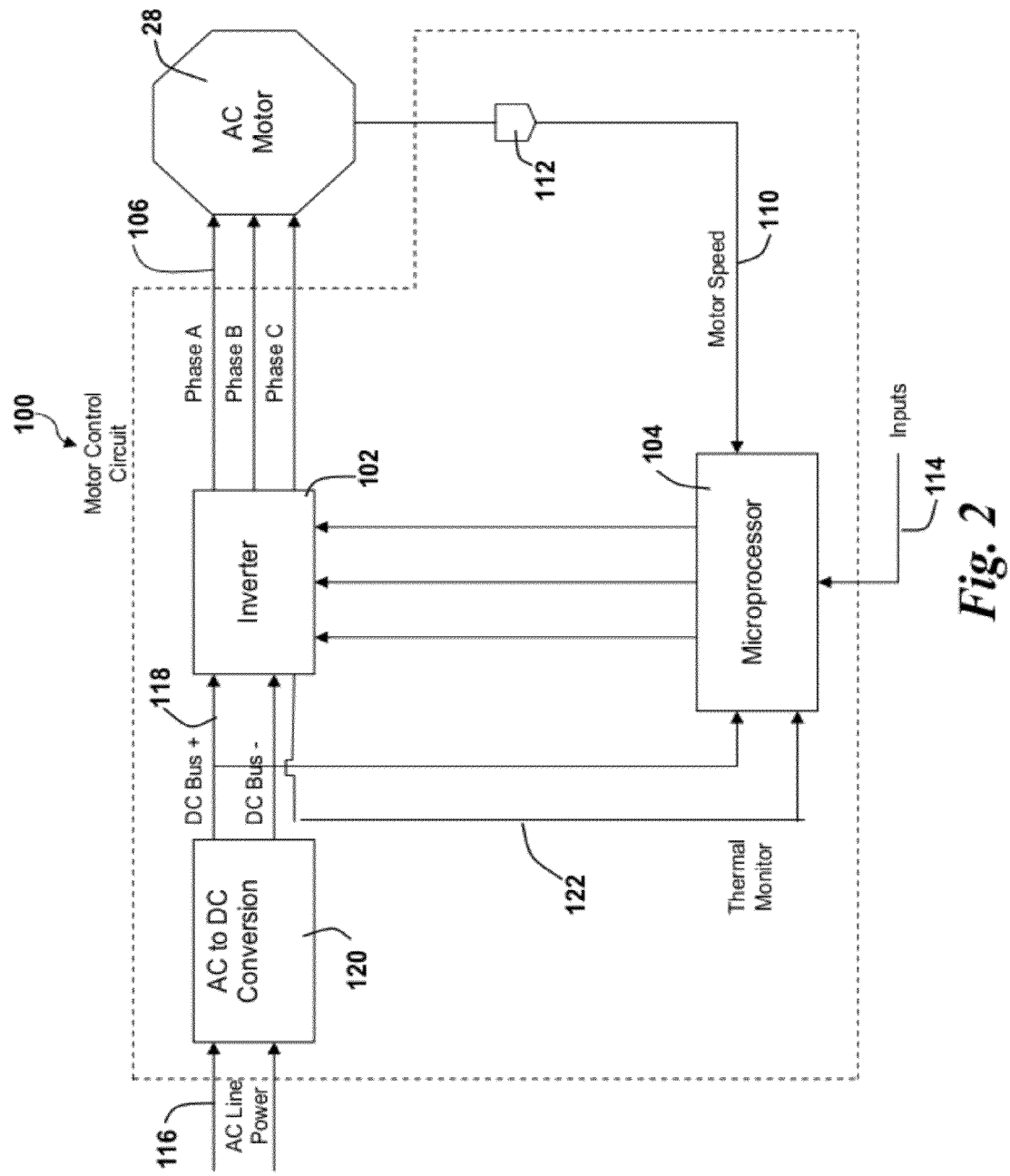
FIG. 2 is a diagram view of an exemplary control system in accordance with aspects of the invention.

FIG. 2 depicts an embodiment of a motor control circuit 100 for variable speed control of motor 28 and braking of the motor in a DC braking process from normal operating speed to a stopped state. In this particular embodiment, the motor 28 is a three-phase motor, for example a three-phase AC induction motor. The circuit includes a microprocessor 104 (that may be a component of the motor controller 30 (FIG. 1)) in communication with an inverter 102. The inverter 102 supplies the three phase power signal components 106 to the motor 28 at a frequency that drives the motor at a defined normal operating speed. The inverter 102 is supplied with DC main power 118 from an AC/DC conversion process 120, which receives line power 116 at a defined frequency and voltage.

The microprocessor is configured for any manner of programming/control inputs 114 for setting or changing the operational functionalities of the washing machine 10, such as the timing and duration of various wash cycles, the operating speeds of the basket 24 and agitator 26 in the agitation and spin modes, and so forth. One of the inputs may be, for example, a brake command generated by a switch when the machine lid 34 is opened during the spin cycle. The microprocessor 104 may also receive a motor speed input signal 110 from a speed sensor 112 for controlling the power signal components 106 during normal operation and for use in the DC braking process. A thermal monitor signal 122 may be provided to the microprocessor 104 from the inverter 102 to trigger trips in the event of abnormal temperatures that may be caused by current spikes or other abnormal operating conditions.

Figure 3:
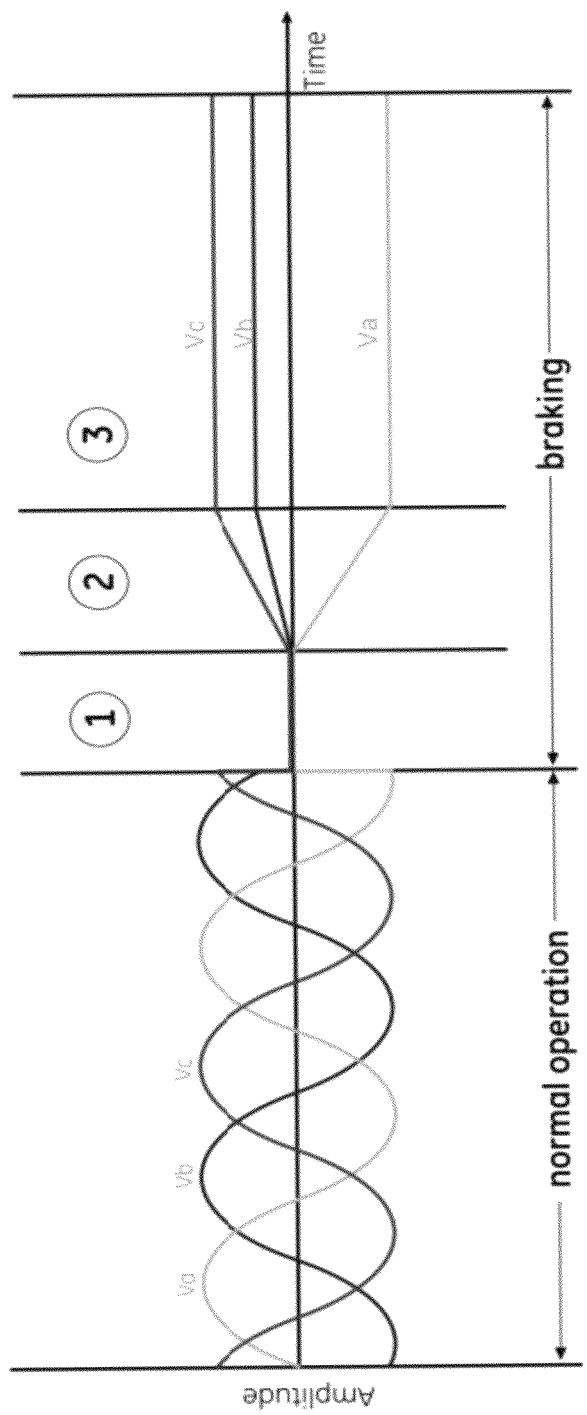
FIG. 3 is a time graph of power signal characteristics for an embodiment of a braking process in accordance with aspects of the invention.
Figure 4:
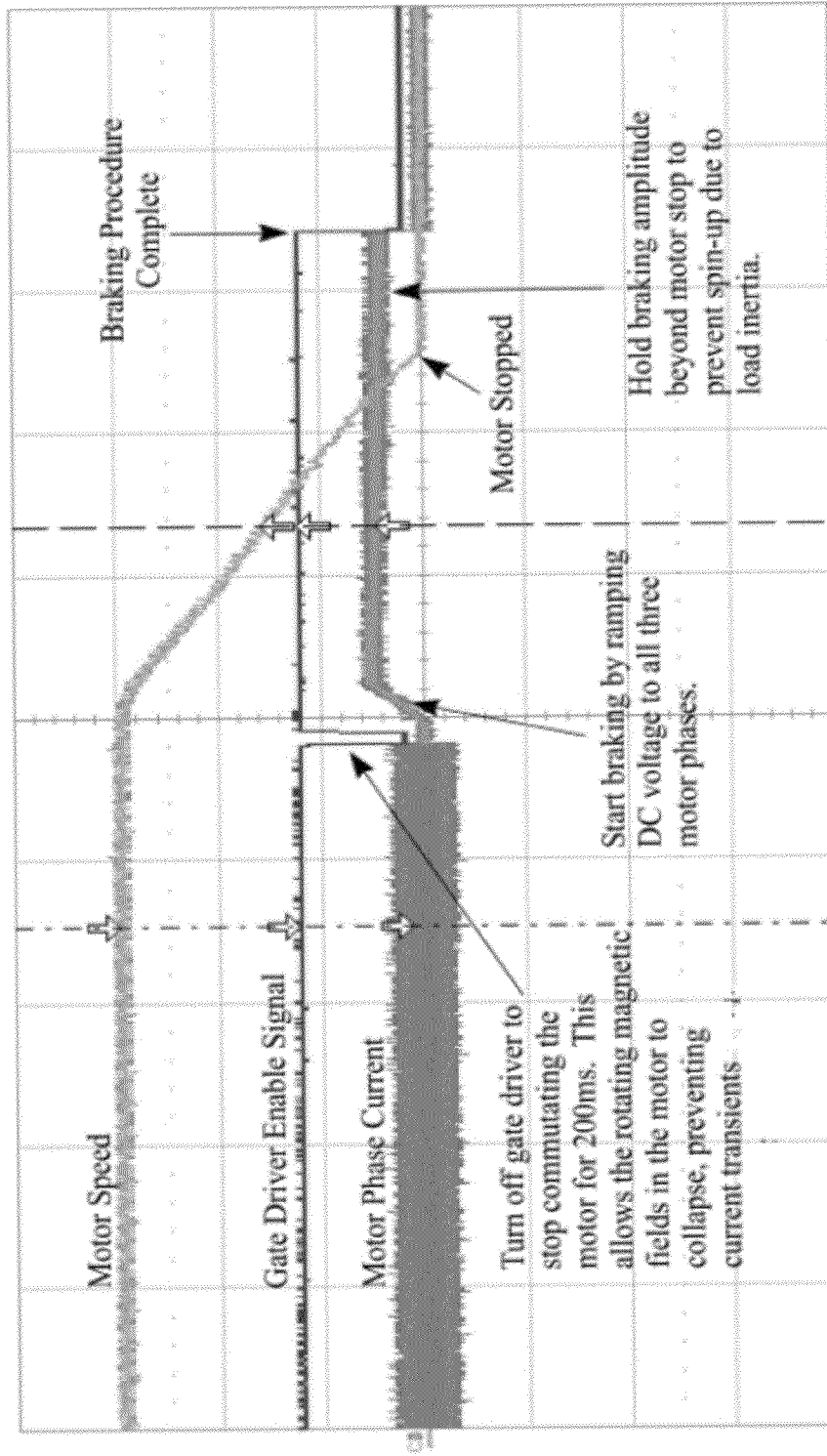
FIG. 4 is a representative O-scope depiction of a braking process on a washing machine AC induction motor in accordance with a particular embodiment.

FIGS. 3 and 4 depict various control functions during a DC braking process in accordance with aspects of the invention. With reference to FIGS. 1 through 4, at "normal operation", the motor 28 is supplied with three-phase power (components Va, Vb, Vc) from the inverter 102 at an amplitude and frequency to spin the basket 24 at operating speed, for example during the spin cycle. At time "1" in FIG. 3, a stop signal is received/generated by the microprocessor 104, which controls the inverter 102 to collapse the rotating magnetic fields in the motor. For example, in the case of an AC induction motor, this may be accomplished by turning off the inverter gate drivers to stop commutating the motor, as indicated in FIG. 4, and "freezing" the frequency of the three-phase power signal components (set to 0 Hz) and setting the amplitude of the power signal components at 0V. For a permanent magnet motor, it may not be desirable to turn off the gate drivers because of the resulting regenerative effect (which could result in an excessive voltage generation if not dissipated with a brake resistor). In this case, the gate drivers may remain enabled while the rotating magnetic fields are essentially collapsed by freezing the frequency and driving the amplitude of the power signal components to zero.

As seen in FIGS. 3 and 4, the power signal components are held at 0 Hz and 0V for a predefined time period to allow dissipation of the rotating torque and to prevent subsequent current transients. In a particular embodiment, this time period may be, for example, about 200 ms (mili-seconds). Other time periods may be readily determined by those skilled in the art.

After the predefined time period (and re-enabling of the gate drivers in the AC induction motor embodiment of FIG. 4), DC braking voltage is applied to the motor at time periods "2" and "3" in FIG. 3 and as depicted in FIG. 4. At time period "2", the DC voltage is ramped from 0V amplitude at a controlled ramp rate to a defined fixed amplitude value at the start of time period "3." During time period "3", the fixed amplitude is held until the microprocessor 104 receives a motor speed signal 110 indicating that the motor has stopped. In a particular embodiment, the fixed amplitude is held for a defined time period after the motor has stopped to prevent subsequent spin-up of the motor from load inertia.

It is to be understood that the term "DC braking voltage" is used herein to encompass any method wherein the motor or phase current is controlled/adjusted by voltage Pulse Width Modulation (PWM) wherein voltage is adjusted to control current to the motor (which is directly proportional to torque).

As depicted in FIG. 3, in the embodiment of multi-phase power component signals, the actual fixed DC amplitude of the respective signals will vary as a function of their frozen phase angles such that the sum of the respective amplitudes is zero at any give instant. This characteristic is desirable for washing machines that are stopped and started a significant number of times in that the current load on the motor windings is distributed over the multiple windings during the life of the motor. In other words, a particular winding may have the maximum DC braking current during a given braking process as a function of its frozen phase angle, and have the minimum current load during the next braking process. Over time, the current load for the braking processes is "shared" by the phase windings.

The microprocessor 104 may increase or decrease the braking torque by varying the ramp rate and/or fixed amplitude of the DC braking voltage as a function of actual motor speed indicated by the motor speed signal 110 to cause a complete stop of the motor within a defined time period, which may be, for example, seven seconds from when the machine lid 34 is opened during a spin cycle. The ramp rate of the DC voltage during time period "2" is set to rapidly achieve the fixed amplitude without causing harmful current spikes. This ramp rate may be, for example, in a particular embodiment about 10% per 10 ms up to the fixed amplitude of about 60V. The ramp rate can vary depending on the overall time permitted for affecting a complete stop of the motor, the magnitude of the fixed amplitude necessary to generate a complete stop of the motor, and so forth. Also, the ramp rate may be linear or non-liner.

Figure 5:
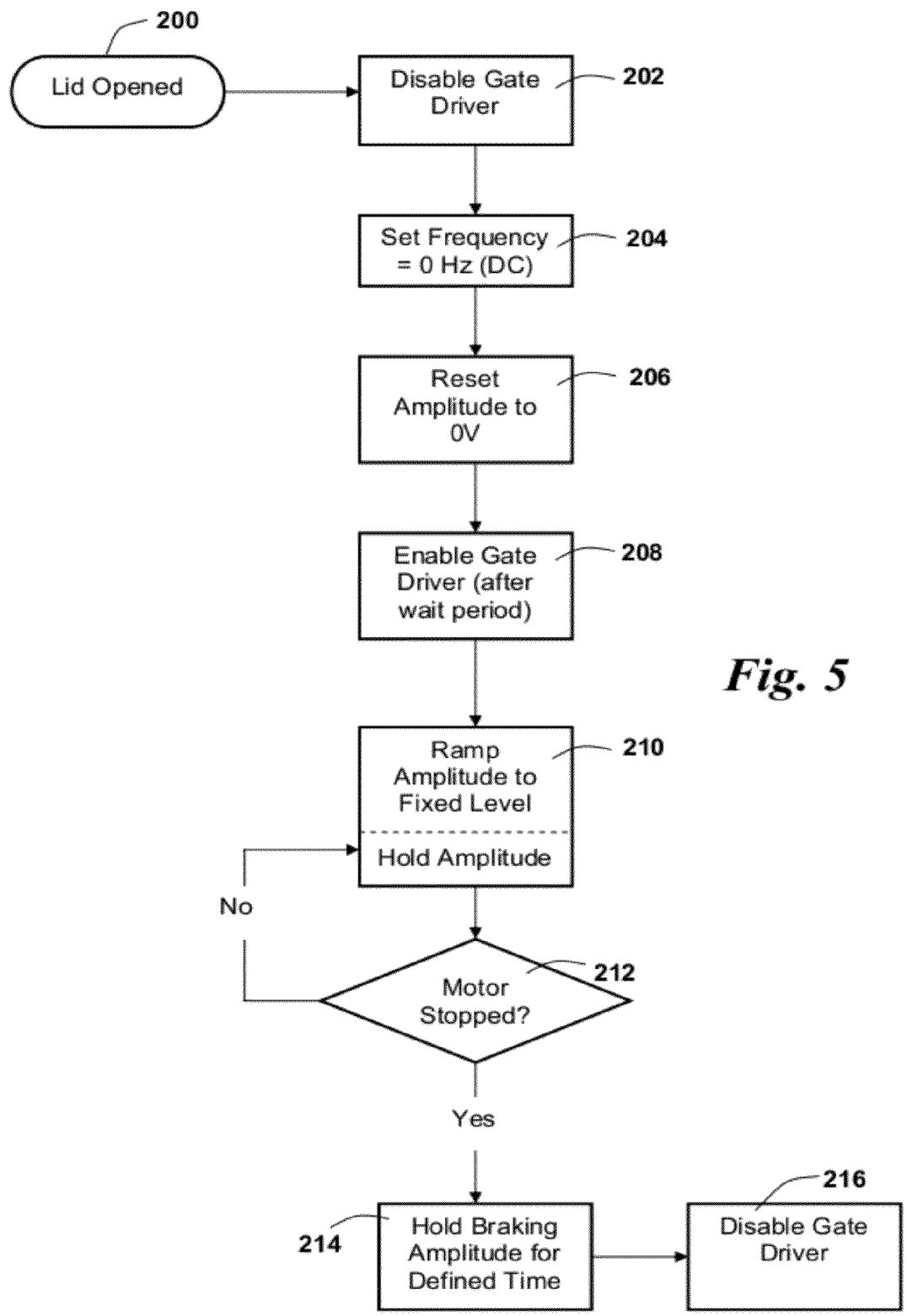
FIG. 5 is a flow chart depiction of an embodiment of a braking process.

FIG. 5 is flow chart indicating steps in an exemplary embodiment of a washing machine motor, for example an AC induction motor. At step 200, the machine lid is opened during a spin cycle and a switch associated with the lid sends a signal to the machine controller 30 (the microprocessor 104) to start the braking process. At step 202, the microprocessor 104 controls the inverter 102 to disable the gate drivers to collapse the motor rotating magnetic fields. At essentially the same time as steps 204 and 206, the frequency of the power signal components is frozen at 0 Hz and the amplitude of the signals is set to 0V. At step 208, the gate drivers are enabled after the predefined wait period, which may be about 200 ms. At step 210, the amplitude of the DC braking voltage to the motor windings is ramped at a defined ramp rate up to a fixed amplitude and held at the fixed amplitude. At step 212, the microprocessor queries whether or not the motor has stopped. If the motor has not stopped, the loop between steps 210 and 212 repeats and the fixed amplitude is held. If the motor has stopped at step 214, then the amplitude is held for an additional predefined time period to ensure that the motor does not re-start due to high load inertia. At step 216, the braking process is complete and the inverter gate drivers are disabled.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of braking a washing machine from an operational speed to a zero speed, the washing machine driven by one of a synchronous or asynchronous three-phase motor, the method comprising:
   upon receipt of a stop signal, collapsing the motor rotating magnetic fields for a predefined time period;
   after the predefined time period, applying DC braking voltage to the motor stator windings at a controlled ramp-up rate to a fixed amplitude to generate a controlled ramped braking torque on the motor; and
   applying the braking torque until the motor is stopped;
   wherein for collapsing the stator rotating magnetic field, the frequency of the three-phase power signal is set to 0 Hz thereby freezing the phase angles of the power signal components, and the amplitude of the power signal components is set to 0 Volts, and wherein the DC braking voltage is subsequently generated by ramping up the amplitude of the power signal components at their respective frozen phase angles such that the amplitudes vary between the power signal components as a function of their frozen phase angles.

2. The method as in claim 1, further comprising continuing to apply the DC braking voltage for a defined time period after the motor has stopped.

3. The method as in claim 1, wherein the motor is an AC induction motor supplied with three-phase AC power from an inverter, further comprising disabling the inverter gate drivers for the predefined time period to collapse the rotating magnetic fields.

4. The method as in claim 1, wherein the magnitude of the braking torque applied to the motor is a function of the amplitude of the applied DC braking voltage, and further comprising setting the amplitude of the DC braking voltage to a value to cause complete stopping of the motor within a defined time period.

5. The method as in claim 4, wherein the ramp rate of the DC braking voltage is set to prevent excessive current spikes while achieving complete stopping of the motor within the defined time period.

6. The method as in claim 1, wherein braking of the motor is controlled by a motor controller, and further comprising supplying the motor controller with a motor speed feedback signal for termination of the DC braking voltage after the motor as stopped.

7. The method as in claim 6, wherein the motor is a three-phase AC motor supplied with three-phase AC power from an inverter, the inverter controlled by the motor controller for collapsing the rotating magnetic fields for the predefined time period and applying the DC braking voltage to the stator windings at the controlled ramp-up rate up to the fixed amplitude to generate the braking torque.

8. The method as in claim 7, wherein the motor controller is programmable to change any combination of: time period between collapsing the rotating magnetic fields and application of the DC braking voltage, ramp rate of the DC braking voltage to the fixed amplitude, the value of the fixed amplitude, and a time period for continued application of the DC braking voltage at the fixed amplitude after the rotor has stopped.

9. A washing machine, comprising:
- a synchronous or asynchronous motor configured for receipt of a multi-phase power signal for rotationally driving a spin basket;
- a motor control circuit, said motor control circuit including an inverter and a motor controller, wherein up receipt of a motor stop signal, said motor controller is configured to:
  - control said inverter to collapse the rotating magnetic fields of said motor for a predefined time period;
  - after the predefined time period, control said inverter to apply DC braking voltage to stator windings of said motor at a controlled ramp-up rate to a fixed amplitude to generate a controlled increasing braking torque applied to said motor; and
  - control said inverter to apply the braking torque until said motor is stopped.

10. The washing machine as in claim 9, wherein said inverter is controlled to apply the DC braking voltage for a defined time period after said motor has stopped.

11. The washing machine as in claim 9, wherein said inverter is configured such that, upon receipt of the stop command by said motor controller, amplitude of the three-phase power signal components from said inverter is set to 0 volts and frequency is set to 0 Hz.

12. The washing machine as in claim 11, wherein said inverter is configured to generate the DC braking voltage by ramping up amplitude of the power signal components at their respective frozen phase angles to the fixed amplitude such that the amplitudes vary between the power signal components as a function of their frozen phase angles.

13. The washing machine as in claim 9, wherein the magnitude of the braking torque applied to said motor is a function of the amplitude of the DC braking voltage of the respective power signal components, said motor controller configured to set the ramp-up rate and fixed amplitude of the DC braking voltage to a value to cause complete stopping of said motor within a defined time period.

14. The washing machine as in claim 9, wherein said motor controller is supplied with a motor speed feedback signal for termination of the DC braking voltage after said motor has stopped.

15. The washing machine as in claim 9, wherein said motor controller is programmable for change any combination of: time period between collapsing the rotating magnetic fields and application of the DC braking voltage, ramp rate of the DC braking voltage to the fixed amplitude, the value of the DC voltage fixed amplitude, and a time period for continued application of the DC braking voltage at the fixed amplitude after said motor has stopped.

* * * * *